United States Patent
Le et al.

(12) 
(10) Patent No.: US 6,826,678 B2
(45) Date of Patent: Nov. 30, 2004

(54) COMPLETION MONITORING IN A PROCESSOR HAVING MULTIPLE EXECUTION UNITS WITH VARIOUS LATENCIES

(75) Inventors: Hung Qui Le, Austin, TX (US); Dung Quoc Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/122,034

(22) Filed: Apr. 11, 2002

(65) Prior Publication Data

US 2003/0196074 A1 Oct. 16, 2003

(51) Int. Cl.[7] .............................................. G06F 9/38
(52) U.S. Cl. ..................................... 712/218; 712/220
(58) Field of Search ................................. 712/218, 220

(56) References Cited

U.S. PATENT DOCUMENTS 5,987,598 A * 11/1999 Levine et al. ............... 712/227
6,144,982 A * 11/2000 Panwar ....................... 718/104
6,574,727 B1 * 6/2003 Davidson et al. ........... 712/227
6,658,555 B1 * 12/2003 Kahle et al. ................. 712/219
6,745,322 B1 * 6/2004 Brockmann et al. ........ 712/239

* cited by examiner

*Primary Examiner*—William M. Treat
(74) *Attorney, Agent, or Firm*—Duke W. Yee; Casimer K. Salys; Michael R. Nichols

(57) ABSTRACT

A method, processor architecture, computer program product, and data processing system for determining when an instruction in a pipelined processor should be completed is provided. As each instruction is issued to an execution unit, an entry for that instruction is placed within a "finish pipe," which consists of a series of consecutively numbered stages. Each clock cycle, the entries in the finish pipe advance one stage. When an entry has reached the stage corresponding to the latency of its associated execution unit, it becomes mature.

Each clock cycle, the finish pipe is scanned to find the entry having the highest-numbered stage of any entry in the finish pipe. If that entry is mature, it is removed from the finish pipe and the instructions associated with that entry is allowed to complete. If not, the entry simply advances along with the other entries and the pipe rescanned in the next cycle.

22 Claims, 4 Drawing Sheets

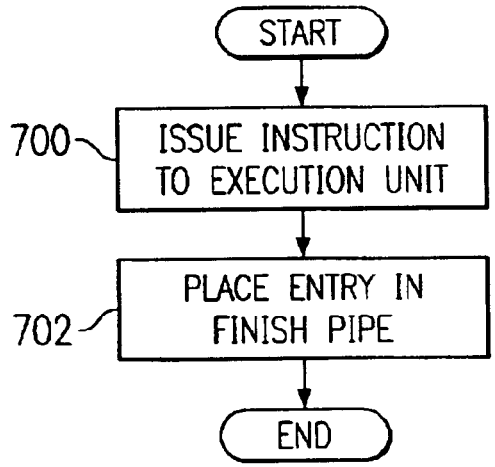
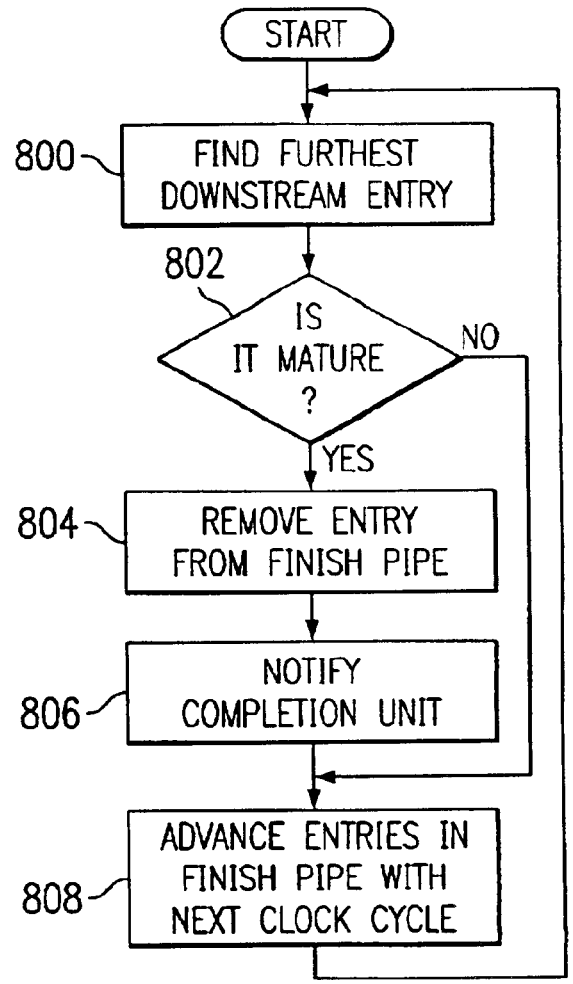

COMPLETION MONITORING IN A PROCESSOR HAVING MULTIPLE EXECUTION UNITS WITH VARIOUS LATENCIES

BACKGROUND OF THE INVENTION

1. Technical Field

The present invention relates generally to dynamic scheduling of instructions in a pipelined processor having multiple execution (functional) units and more specifically relates such dynamic scheduling in processors in which the multiple execution units have varying latencies.

2. Description of Related Art

Pipelining is a commonly employed technique for enhancing the performance of a computer architecture. The simplest form of pipelining, known as linear pipelining, functions like an assembly line. In a linear pipeline, a series of processing stages are connected in cascade. Instructions move from one processing stage to the next in sequence, with each stage in the pipeline operating on a different instruction. For example, in a typical linear pipeline, there may be fetch, decode, execute and writeback stages. The writeback stage will be performing the writeback portion of processing an instruction, while the execute stage is executing the next instruction, the decode stage is decoding the next instruction after that, and so forth. Pipelining speeds the execution of a processor, because it allows multiple instructions to be processed (at least in part) at the same time.

Nonlinear pipelined processors provide similar increases in speed, but are more complex. For example, in a nonlinear pipelined processor, there may be multiple execution units. An execution unit (also called a functional unit) is a portion of a processor that performs one or more operations on data. For example, an arithmetic logic unit, which can perform such operations as addition or subtraction, may be an execution unit. Many pipelined processors employ multiple execution units in "execute" stages of the pipeline. In this way multiple instructions can not only be processed in the pipeline at once, but these instructions can also be executed at once.

If one envisions a pipeline as a highway, then an execution stage that employs multiple execution units is like a portion of the highway that widens from a single lane to multiple lanes. Just as cars on a multi-lane highway can travel side-by-side, instructions may travel side-by-side through multiple execution units. After the instructions pass through the execute stage of the pipeline, the instructions will typically reenter a single pipeline in some particular order. This situation is analogous to cars merging into a single lane as the highway narrows.

These multiple execution units may all be the same. For example, there may be five identical arithmetic logic units employed. Typically, however, the execution units are different and perform different types of operations. For example, two of the units may be arithmetic logic units, while another two of the units are floating-point math units. Different units executing different instructions may take differing amounts of time to complete the execution of each of the instructions. For example, a floating-point math unit performing a division operation will typically take longer to complete its operation than will an arithmetic logic unit performing a logical exclusive-or. The time it takes for an execution unit to perform its task is called the "latency" of the execution unit. When an execution unit has performed the task, the execution unit is said to have "finished" the instruction.

Having multiple execution units performing different operations with different latencies, however, allows some instructions to complete their execution before others. Returning to the highway analogy, this situation is like one car passing another. By having multiple execution units, simpler instructions move through the pipeline more quickly than more complicated instructions. This increases the overall throughput of the processor.

The situation is not quite that simple, however. Typically, the instructions in a given computer program are not independent of one another. Although instructions can often be reordered for faster execution, there are limits to the ability of a processor to rearrange instructions. This typically occurs when an instruction must use the result of a previous instruction. For example, the operations "Z=X+Y" and "X=Z-6" will yield different results if executed in different orders, since the result of whichever is executed first is used to calculate the result of the one that is executed second. This is analogous to a family that is traveling along a highway in two cars, where one of the drivers is following the other. If the following car passes the leading car, the following car will not know where to go and may get lost.

Just as it is sometimes necessary to one car in a caravan to wait for another, in a pipelined processor it is sometimes necessary to require one instruction to wait until another instruction has completed its processing before being allowed to execute. This is what is known as "dynamic instruction scheduling."

There are many schemes used for dynamic scheduling, such as Tomasulo's Algorithm and scoreboarding, which were developed for historical computer systems, the IBM 360/91 computer and the CDC 6600 computer, respectively. Both of these schemes rely on identifying when results of previous instructions become available. These schemes are described in more detail in Kai Hwang, *Advanced Computer Architecture*, McGraw-Hill (1993), Ch. 6, pp. 288–91.

Once an instruction has been executed by an execution unit (i.e., once the execution unit has finished the instruction), the results must be collected and placed in the pipeline to be passed on to subsequent stages. Collecting the results and processing them through subsequent stages is called "completing" the instruction. Returning to the highway analogy, the instructions must "merge into a single lane" to keep going through the pipeline. One of ordinary skill will note the dichotomy between "finishing" and "completing." An instruction is finished (or an instruction finishes) when the execution unit has performed the instruction; and instruction is completed (or an instructions completes) when the result of the finished instruction is passed to the next stage in the pipeline.

As anyone who has done much driving on an urban expressway will attest, "completing" an instruction is a non-trivial task. The objective is to maximize throughput of instructions while maintaining a valid ordering of the instructions. Therefore, a need exists for a simple, yet effective means of producing this ordering.

SUMMARY OF THE INVENTION

The present invention provides a method, processor architecture, computer program product, and data processing system for determining when an instruction in a pipelined processor should be completed. A "finish pipe" is established with stages numbered 1-N, where N is the length of the longest latency, measured in clock cycles. As each instruction is issued to an execution unit, an entry for that instruction is placed within the finish pipe. The entry may contain such information as latency of the execution unit to which the instruction has been issued and an identification of the execution unit to which the instruction has been issued. Each clock cycle, the entries in the finish pipe are advanced by one stage. When an entry has reached the stage corresponding to the latency of its associated execution unit, it becomes mature.

Each clock cycle, the finish pipe is scanned starting at stage N and working backward toward stage 1 to find the entry having the highest-numbered stage of any entry in the finish pipe. If that entry is mature, the entry is removed from the finish pipe and the instructions associated with that entry is allowed to complete. If the entry is not mature, the entry simply advances along with the other entries and the pipe rescanned in the next cycle.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flow chart representation of a process of issuing instructions in an execute stage in accordance with a preferred embodiment of the present invention; and FIG. 8 is a flow chart representation of a process of determining when instructions are ready to be finish in accordance with a preferred embodiment of the present invention.

DETAILED DESCRIPTION OF THE PREFERRED EMBODIMENT

Figure 1:
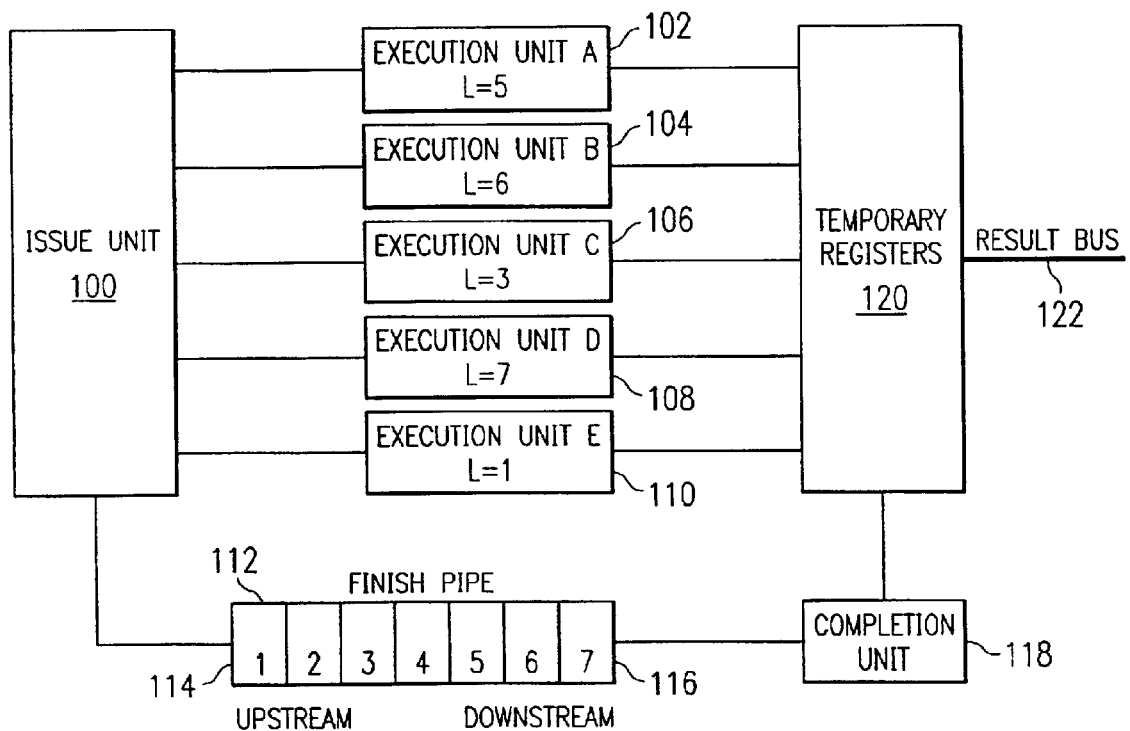
FIG. 1 is a diagram depicting the architecture of an execute stage in a processor made in accordance with a preferred embodiment of the present invention.

FIG. 1 is a diagram depicting the architecture of an execute stage in a processor made in accordance with a preferred embodiment of the present invention. In a preferred embodiment, the execute stage depicted in FIG. 1 is one stage of a multi-stage pipeline. As instructions reach the execute stage, issue unit 100 forwards the instructions to the proper execution units from execution units 102–110. In a preferred embodiment, issue unit 100 forwards a single instruction to an execution unit each cycle of the processor clock. Most processors have some sort of periodic timing signal or clock signal that is used to time the execution of instructions in a synchronous manner.

Each of execution units 102–110 has an associated latency. The latency is the amount of time is takes for a given execution unit to perform the instruction that it is designed to do. The latency of any given execution unit is generally measured as a number of clock cycles. For example, execution unit 102 is shown as having a latency of five clock cycles. That means that execution unit 102 takes five clock cycles to perform its operation. Different execution units within the same processor may have different latencies. For example, while execution unit 102 has a latency of five clock cycles, execution unit 108 has a latency of seven clock cycles. Once the instruction has finished (i.e., the execution unit has performed the task defined by the instruction), the result of the executed instruction will be passed to temporary registers 120. Temporary registers 120 will, in a preferred embodiment, hold the result until the instruction is ready to be completed, so execution unit 108 is free to execute other instructions while the result is being held.

The processor determines when a given instruction is ready to be completed by using finish pipe 112. Finish pipe 112 is a pipeline having a number of stages. In a preferred embodiment, the number of stages in finish pipe 112 is equal to the longest latency of any of the execution units. For example, in FIG. 1, execution unit 108 has a latency of seven clock cycles. In the example, no other execution unit has a latency that long. Therefore, finish pipe 112 has seven stages.

As issue unit 100 issues an instruction to the proper execution unit, an entry corresponding to that instruction is generated and placed in upstream end 114 of finish pipe 112. Each clock cycle, the entries in finish pipe 112 are advanced one stage further down stream in finish pipe 112. When an entry corresponding to an instruction that has been forwarded to an execution unit reaches the stage corresponding to the latency of that execution unit, the entry is designated as mature. For example, if an instruction is forwarded to execution unit 106, which has a latency of three, the entry associated with that instruction would become mature when it reaches the third stage of finish pipe 112. An instruction is ready to be completed by the processor when the instruction is the furthest downstream on any entry in finish pipe 112 and it is mature.

When an instruction is ready to be completed, its entry is removed from finish pipe 112, and completion unit 118 is notified that the instruction is ready to be completed. Completion unit 118 then directs temporary registers 120 to pass the result of the instruction to the next stage in the pipeline (via result bus 122, for example). In a preferred embodiment, the result will eventually flow through the remainder of the pipeline to be written to a register file or memory as needed. This process is called completing the instruction.

Figure 2:
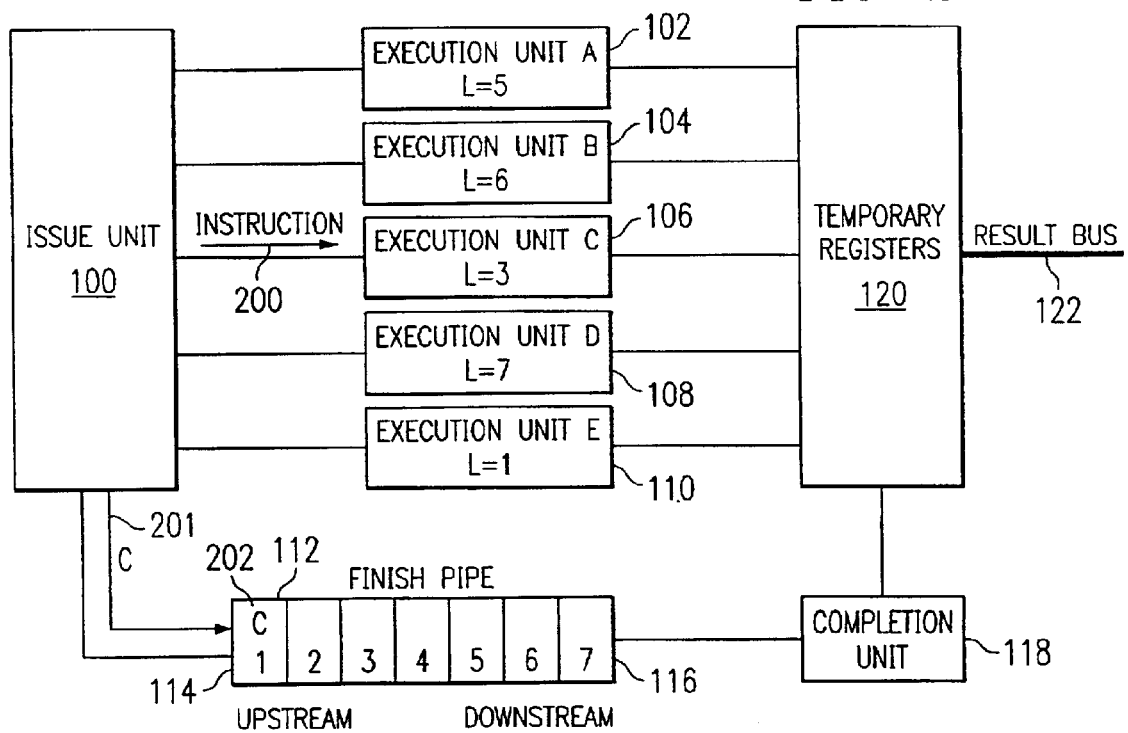
FIGS. 2–6 provide an example of how an execute stage may operate in accordance with the preferred embodiment of the present invention

FIGS. 2–6 provide an example of how an execute stage may operate in accordance with the preferred embodiment of the present invention. In FIG. 2, issue unit 100 forwards an instruction 200 to execution unit 106. Meanwhile, issue unit 100 generates (201) an entry 202 in finish pipe 112. Entry 202 corresponds with instruction 200, which was forwarded to execution unit 106. As depicted in FIG. 2, entry 202 provides an identification of the execution unit to which instruction 200 was forwarded, namely execution unit 106. One of ordinary skill in the art will note that entry 202 need not contain this exact information. Instead, entry 202 may contain any information that serves to associate entry 202 with the latency of the execution unit executing instruction 200. For example, entry 202 may contain any or all of the following pieces of information: an instruction ID identifying the instruction, an execution unit ID identifying the execution unit to which the instruction has been forwarded, or the latency of the execution unit to which the instruction has been forwarded.

Figure 3:
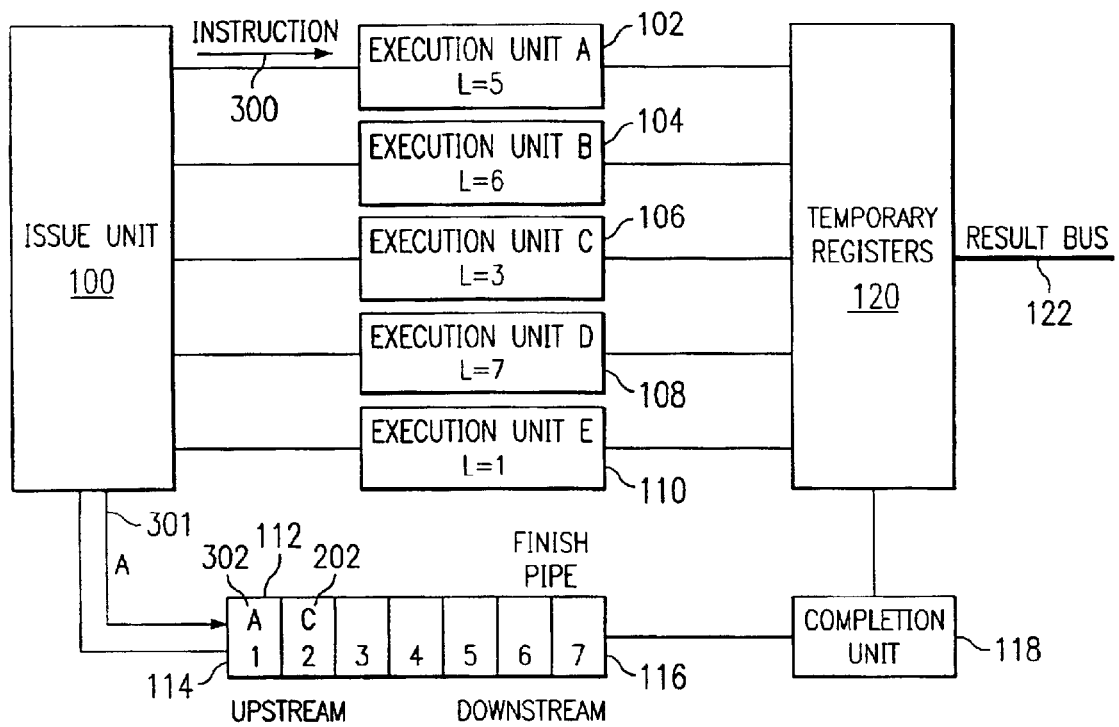

Although entry 202 is the furthest downstream of any entry currently in finish pipe 112, because entry 202 is not mature, instruction 200 is not ready to be completed. Thus, entry 202 will be advanced one stage in finish pipe 112 on the next clock cycle. FIG. 3 depicts the operation of the execute stage in the next clock cycle. Entry 202 has been advanced one stage in finish pipe 112. Meanwhile, issue unit 100 has forwarded instruction 300 to execution unit 102.

Issue unit 100 has also generated (301) a second entry 302 in finish pipe 112. Entry 202 is still the furthest downstream of any entry in finish pipe 112, but entry 202 is not yet mature. Therefore, entry 202 and entry 302 will be advanced one stage in finish pipe 112 on the next clock cycle.

Figure 4:
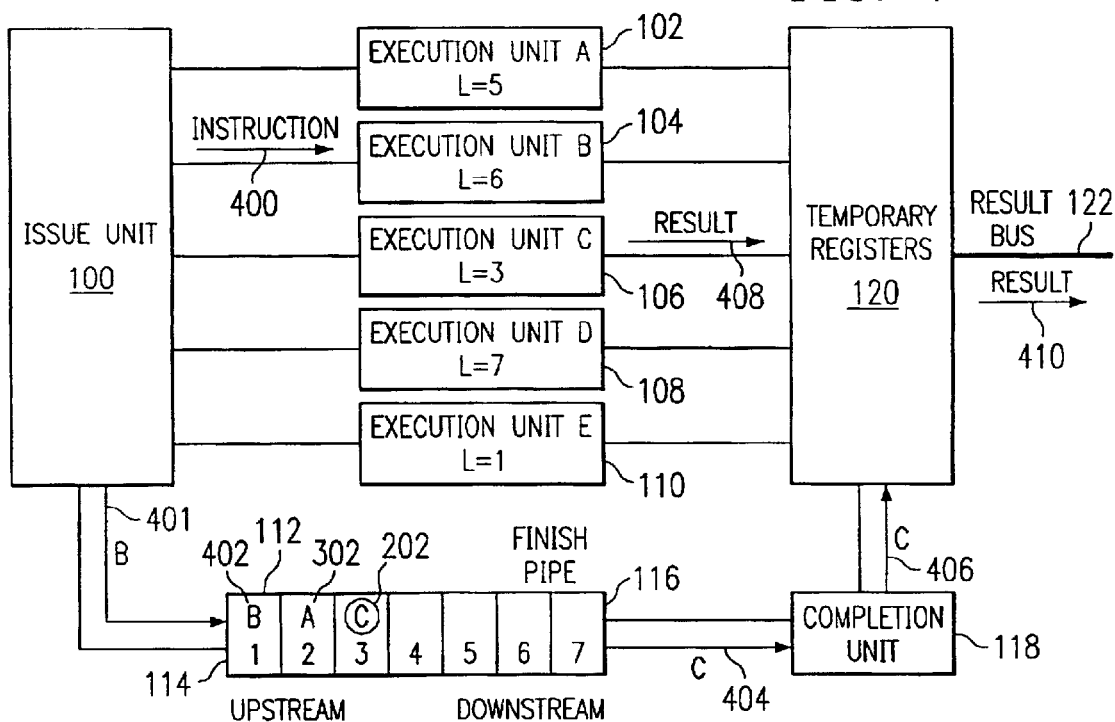

FIG. 4 depicts the operation of the execute stage in the next clock cycle. Issue unit 100 issues instruction 400 to execution unit 104. Issue unit 100 also generates (401) an entry 402 in finish pipe 112. Now, however, entry 202 has advanced to the third stage in finish pipe 112. Because entry 202 is associated with an instruction that has been forwarded to execution unit 106 and execution unit 106 has a latency of three clock cycles, entry 202 is now mature, since it has reached the third stage in finish pipe 112. Because entry 202 is now mature, entry 202 will be removed from finish pipe 112. Completion unit 118 will then be notified (404) that the instruction associated with entry 202 is now ready to be completed. Meanwhile, the result (408) associated with entry 202 is passed to temporary registers 120. Completion unit 118 will then direct (406) temporary register 120 to pass the result (410) to the next stage in the pipeline (via result bus 122, for example). The result will flow through the remainder of the pipeline and, in a preferred embodiment, will be written to memory or a register file as needed.

Figure 5:
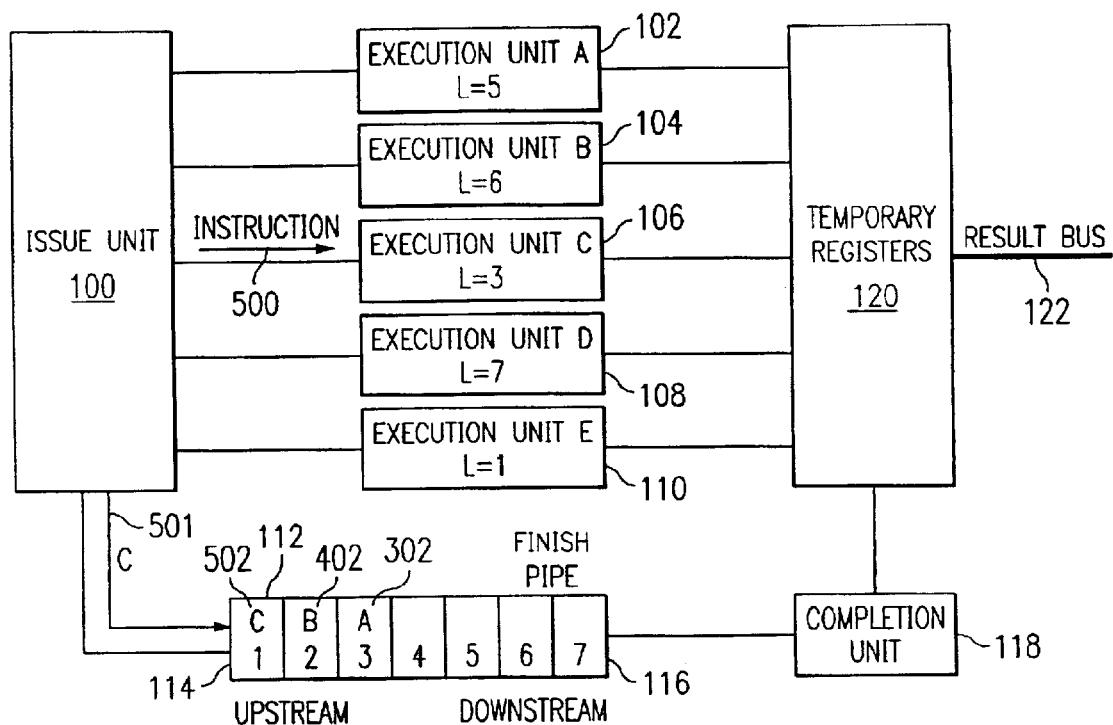
Figure 6:
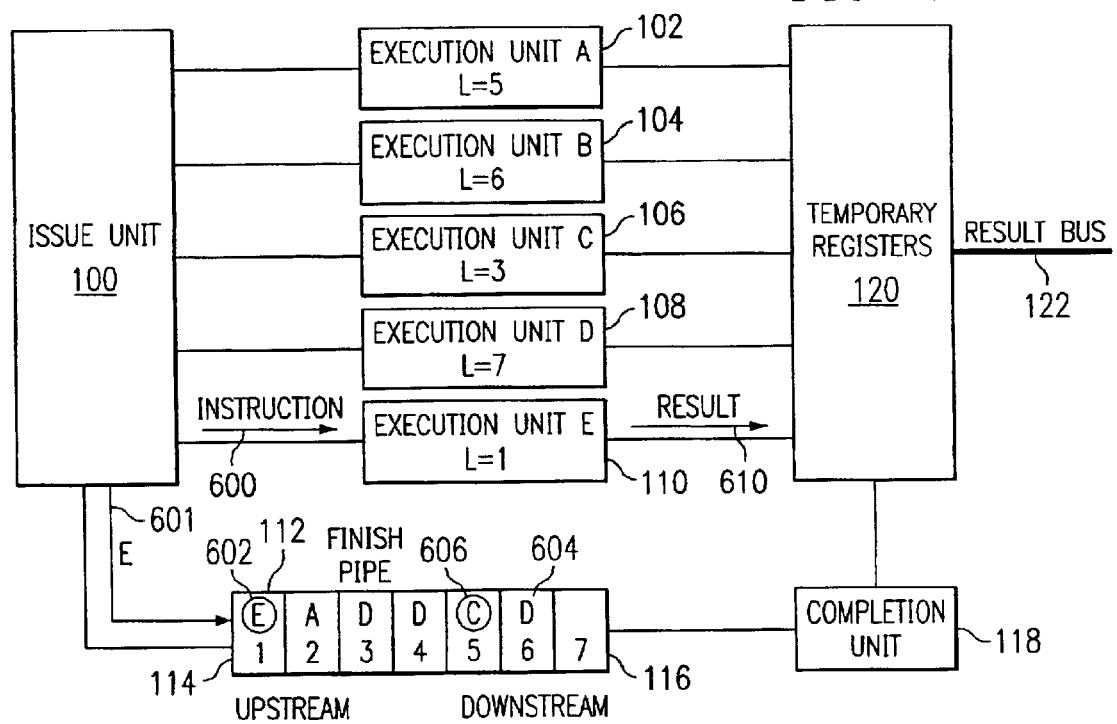

FIG. 5 depicts the operation of the execute stage after one additional clock cycle. Issue unit 100 issues an instruction 500 to execution unit 106. Issue unit 100 also generates (501) a new entry 502 in finish pipe 112. Entries 302 and 402 have been advanced one more stage down stream in finish pipe 112. Now entry 302 is the furthest downstream of any entry in finish pipe 112, but entry 302 is not mature. Therefore, entries 302, 402, and 502 will be advanced one stage in finish pipe 112 on the next clock cycle.

Sometimes a situation will arise where multiple entries in the finish pipe are mature or where entries in the finish pipe are mature but the furthest downstream entry is not mature. An instruction is ready to complete only if its entry is the furthest downstream in the finish pipe and it is mature. For example, in FIG. 6, entry 602 and entry 606 are both mature (and result 610 corresponding to entry 602 is currently passed to temporary registers 120), however, neither of these entries is the furthest downstream in finish pipe 112. Rather, entry 604 is the furthest downstream in finish pipe 112. Entry 604, however, is not mature, because it is associated with execution unit 108, which has a latency of seven, and entry 604 has not yet reached the seventh stage of finish pipe 112. In the situation depicted in FIG. 6, all of the entries in finish pipe 112 will be advanced one stage at the next clock cycle.

Thus, even though entries 602 and 606 are mature, the instructions associated with those entries are not yet allowed to be completed, because there are older (further downstream) entries for unfinished instructions in the finish pipe. One of ordinary skill in the art will recognize that although the instructions corresponding to these mature entries are not yet allowed to be completed, their results may be forwarded to other instructions that depend on those results. This can be done through any one of a number of techniques, including, but not limited to, data forwarding and register renaming.

FIG. 7 is a flow chart representation of a process of issuing instructions in an execute stage in accordance with a preferred embodiment of the present invention. First, the issue unit issues or forwards an instruction to an appropriate execution unit (step 700). As the instruction is issued to its proper execution unit, an entry is generated for that instruction and placed within the finish pipe (step 702).

FIG. 8 is a flow chart representation of a process of determining when instructions are ready to complete in accordance with a preferred embodiment of the present invention. First, the furthest downstream entry in the finish pipe is determined (step 800). If the entry is mature (step 802: yes), that entry is removed from the finish pipe (step 804). Then, the completion unit is notified that the instruction is ready to complete (step 806). Then, the entries in the finish pipe are advanced one stage with the next clock cycle (step 808). If the furthest downstream entry was not mature (step 802: no), step 808 is executed without executing steps 804 and 806. The process then cycles to step 800 for the next entry in the finish pipe.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms (such as hardware microcode, for example) and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:

in response to an instruction being issued to an execution unit having a associated latency, placing an entry associated with the instruction into an upstream end of a finish pipe;

in response to a clock cycle, advancing the entry through the finish pipe;

in response to the entry reaching a stage in the finish pipe that corresponds to the associated latency of the execution unit, designating the entry as mature; and in response to a condition in which the entry is a furthest downstream entry in the finish pipe and the entry has been designated mature, performing at least one of removing the entry from the finish pipe, notifying a completion unit, and completing the instruction.

2. The method of claim 1, further comprising:

in response to a condition in which the entry is the furthest downstream entry in the finish pipe and the entry has been designated mature, removing the entry from the finish pipe.

3. The method of claim 1, further comprising:
in response to a condition in which the entry is the furthest downstream entry in the finish pipe and the entry has been designated mature, notifying a completion unit.

4. The method of claim 1, further comprising:
in response to a condition in which the entry is the furthest downstream entry in the finish pipe and the entry has been designated mature, completing the instruction.

5. The method of claim 1, further comprising:
in response to the entry being in a furthest downstream stage of the finish pipe, completing the instruction.

6. The method of claim 1, wherein the entry includes an identification of the execution unit.

7. The method of claim 1, wherein the execution unit is one of a plurality of execution units, and wherein the finish pipe has a number of stages that is a function of a latency of a longest-latency execution unit from the plurality of execution units, wherein the latency of the longest-latency execution unit is the highest latency of any of the plurality of execution units.

8. The method of claim 7, wherein the finish pipe has a number of stages that is equal to the latency of the longest-latency execution unit as measured in clock cycles.

9. A data processing system comprising:
means, responsive to an instruction being issued to an execution unit having a associated latency, for placing an entry associated with the instruction into an upstream end of a finish pipe;
means, responsive to a clock cycle, for advancing the entry through the finish pipe;
means, responsive to the entry reaching a stage in the finish pipe that corresponds to the associated latency of the execution unit, for designating the entry as mature; and
means, responsive to a condition in which the entry is a furthest downstream entry in the finish pipe and the entry has been designated mature, for performing at least one of removing the entry from the finish pipe, notifying a completion unit, and completing the instruction.

10. The data processing system of claim 9, further comprising:
means, responsive to the entry being in a furthest downstream stage of the finish pipe, for completing the instruction.

11. The data processing system of claim 9, wherein the entry includes an identification of the execution unit.

12. The data processing system of claim 9, wherein the execution unit is one of a plurality of execution units, and wherein the finish pipe has a number of stages that is a function of a latency of a longest-latency execution unit from the plurality of execution units, wherein the latency of the longest-latency execution unit is the highest latency of any of the plurality of execution units.

13. The data processing system of claim 12, wherein the finish pipe has a number of stages that is equal to the latency of the longest-latency execution unit as measured in clock cycles.

14. A processor comprising:
a plurality of execution units, each execution unit having an associated latency;
an instruction issue unit coupled to the plurality of execution units;
a periodic timing signal that is coupled to the finish pipe;
a finish pipe having an upstream end that is coupled to the instruction issue unit, a downstream end, and a plurality of stages; and
a completion unit that is coupled to the finish pipe:
wherein the instruction issue unit issues an instruction to an execution unit that is from the plurality of execution units;
wherein the instruction issue unit places an entry in a stage of the finish pipe at the finish pipe's upstream end;
wherein in response to the periodic timing signal, the finish pipe advances the entry to a further downstream stage in the finish pipe;
wherein in response to the entry reaching a stage in the finish pipe that corresponds to the associated latency of the execution unit that is from the plurality of execution units, the finish pipe designates the entry as mature; and
wherein the completion unit detects a condition in which the entry is the furthest downstream entry in the finish pipe and the entry has been designated mature.

15. The processor of claim 14, wherein:
in response to a condition in which the entry is the furthest downstream entry in the finish pipe and the entry has been designated mature, the entry is removed from the finish pipe.

16. The processor of claim 14, further comprising:
a set of temporary registers coupled to the execution unit that is from the plurality of execution units:
wherein a result of the instruction is passed from the execution unit that is from the plurality of execution units to the set of temporary registers; and
wherein in response to the completion unit detecting the condition, the result is passed from the set of temporary registers to a destination.

17. The processor of claim 16, wherein the destination is one of a register file and memory.

18. The processor of claim 16, wherein the destination is a subsequent pipeline stage.

19. The processor of claim 14, wherein the entry includes an identification of the execution unit that is from the plurality of execution units.

20. The processor of claim 14, wherein the finish pipe has a number of stages that is a function of a latency of a longest-latency execution unit from the plurality of execution units, wherein the latency of the longest-latency execution unit is the highest latency of any of the plurality of execution units.

21. The processor of claim 20, wherein the finish pipe has a number of stages that is equal to the latency of the longest-latency execution unit as measured in cycles of the periodic timing signal.

22. The processor of claim 14, wherein the processor is a microprocessor.

* * * * *